United States Patent [19]

Buchnag

[11] Patent Number: 4,979,255

[45] Date of Patent: Dec. 25, 1990

[54] GRILL SCRUBBING AND SCRAPING APPARATUS

[76] Inventor: Kamal M. Buchnag, P.O. Box 11012, Knoxville, Tenn. 37939

[21] Appl. No.: 380,113

[22] Filed: Jul. 14, 1989

[51] Int. Cl.⁵ .................. B21B 45/02; B08B 9/08
[52] U.S. Cl. ............................................. 15/4; 15/56; 15/93 R; 15/256.5; 15/93.1
[58] Field of Search ........... 15/4, 56, 93 R, 320, 15/256.5, 256.52, 21 R, 21 C, 91

[56] References Cited

U.S. PATENT DOCUMENTS

| | | | |
|---|---|---|---|
| 580,312 | 4/1897 | Harris | 15/77 |
| 2,179,963 | 11/1939 | Spadone | 15/77 |
| 2,225,272 | 12/1940 | Horne | 15/4 |
| 2,885,701 | 5/1959 | Pelzer | 15/93 |
| 3,026,550 | 3/1962 | Bollin | 15/21 R |
| 3,406,417 | 10/1968 | Niles et al. | 15/4 |
| 3,999,238 | 12/1976 | Hanson | 15/56 |
| 4,117,855 | 10/1978 | Olcott | 134/141 |
| 4,403,365 | 9/1983 | Hanson | 15/56 |
| 4,486,911 | 12/1984 | Beke | 15/21 R |
| 4,692,959 | 9/1987 | Monson | 15/320 |
| 4,771,504 | 9/1988 | Van Ginhoven et al. | 15/4 |

Primary Examiner—Harvey C. Hornsby
Assistant Examiner—Gary K. Graham
Attorney, Agent, or Firm—Luedeka, Hodges & Neely

[57] ABSTRACT

An apparatus for scrubbing and scraping the surface of a grill or the like utilizes a rotating head having a first member to which a scrubbing pad is attached and a second member to which a scraper is attached. The second member is movably attached to the first member for movement between a first position at which rotation of the head engagably moves both the scrubbing pad and the scraper across the surface being cleaned and a second position at which rotation of the head engagably moves only the scrubbing pad across the surface being cleaned. The apparatus also includes a detergent application system for dispensing liquid detergent over the region of the grill surface being cleaned and a vacuum system for removing spent detergent and materials, such as grease and grime, loosened from the surface by the head.

17 Claims, 5 Drawing Sheets

GRILL SCRUBBING AND SCRAPING APPARATUS

BACKGROUND OF THE INVENTION

This invention relates generally to cleaning apparatus and relates more particularly, to apparatus for scrubbing and/or scraping the surface of a grill or the like.

When cleaning the cooking surface of a grill, the surface is commonly scraped with an edged instrument and subsequently scrubbed with a brush or cleaning pad. Commonly, the scraping and scrubbing operations are both carried out manually and consume a great deal of time and energy. In fast food establishments during which cooking surfaces must be cleaned at relatively short intervals of time, such scrubbing and scraping operations may lead to incipient costs.

It would be desirable to provide a single apparatus for scraping and scrubbing the surface of a grill or the like with a smaller expenditure of manual energy and in a shorter period of time than that required by conventional manual techniques.

Another object of the present invention is to provide such an apparatus having means facilitating the removal of materials, such as grease and grime, loosened from the cooking surface by the apparatus.

Still another object of the present invention is to provide such an apparatus having means for dispensing a liquid detergent or similar fluid to the area of the surface being cleaned.

Yet another object of the present invention is to provide such an apparatus which is table-mounted for movement into and out of an operative position adjacent a grill surface.

A further object of the present invention is to provide such an apparatus which can be switched between a scrubbing mode of operation and a scraping mode of operation.

A still further object of the present invention is to provide a system which is particularly well-suited for scrubbing and scraping the surface of a clam shell grill.

A yet further object of the present invention is to provide such an apparatus which is economical to construct and effective in operation.

SUMMARY OF THE INVENTION

This invention resides in an apparatus for scraping and scrubbing the surface of a grill or the like.

The apparatus includes a head supported for rotation about an axis and means for rotating the head about its axis. The head includes first means for supporting one of a scrubbing pad and a scraper for movement about the rotation axis and second means for supporting the other of the scrubbing pad and scraper for movement about the rotation axis. The first and second supporting means are interconnected for movement of the second supporting means relative to the first supporting means between a first condition at which both the scraper and scrubber engagably move across the surface being cleaned when the head is positioned in operative relationship with the surface and rotated about its axis and a second condition at which only one of the scraper and scrubbing pads engagably moves across the surface when the head is positioned in operative relationship with the surface and rotated about its axis. The apparatus also includes means for moving the second supporting means between the first and second conditions so that the apparatus can be switched between a first mode of operation at which both the scraper and scrubbing pad engagably moves across a surface to be cleaned and a second mode of operation at which only one of the scraper and scrubbing pad engagably move across the surface.

DETAILED DESCRIPTION OF THE ILLUSTRATED EMBODIMENTS

Figure 1:
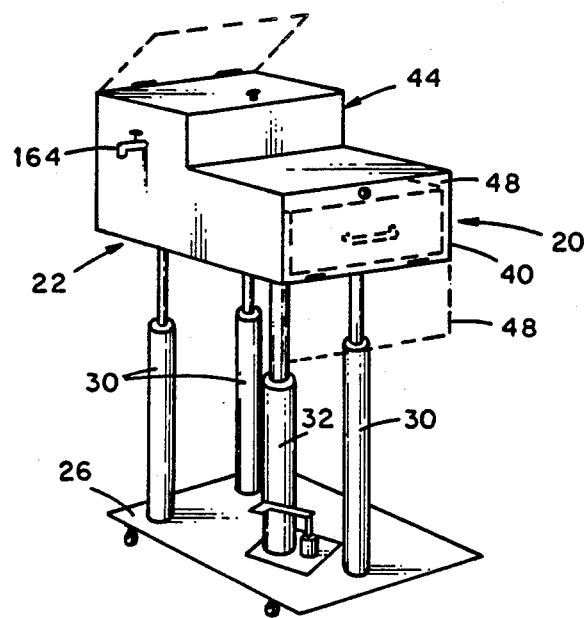
FIG. 1 is a perspective view of a wheeled platform within which one embodiment of an apparatus for scraping and scrubbing the surface of a grill is housed.
Figure 2:
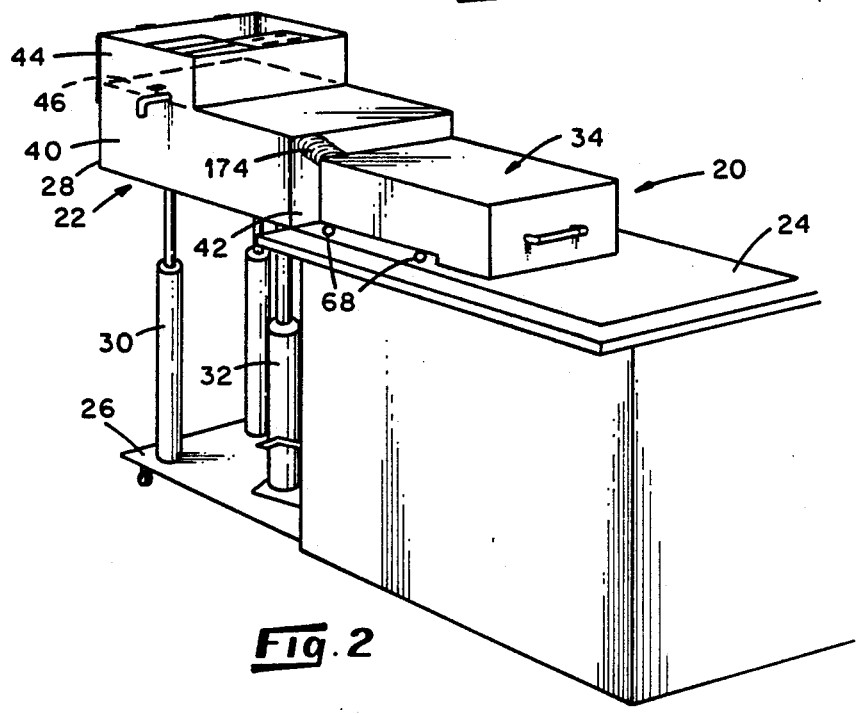
FIG. 2 is a perspective view of the platform of FIG. 1 and a portion of the apparatus shown operatively positioned upon the surface of a grill.

Turning to the drawings in greater detail, there is shown in FIGS. 1 and 2, an embodiment, generally indicated 20, of an apparatus supported by a wheeled platform 22 for movement into and out of a position adjacent a grill cooking surface 24 (FIG. 2) at which the apparatus 20 can be used to scrape and scrub the grill surface 24. The wheeled platform 22 includes a wheeled base 26, a table 28, and three telescoping legs 30 extending between the base 26 and table 28. The platform 22 also includes a hydraulic lift 32 extending between the base 26 and the table 28 enabling the table 28 to be raised or lowered relative to the base 26 for positioning the apparatus 20 adjacent grills whose surfaces to be scraped and scrubbed are at alternative heights. The lift 32 can be manually or electrically operated. The apparatus 20 includes a scrubbing/scraping portion 34 movable onto and off of the table 28 so that when the table 28 is positioned beside a grill to be cleaned, the scrubbing/scraping portion 34 can be moved from the table 28 to a position over the grill for selectively scrubbing or scraping the grill surface 24.

Figure 3:
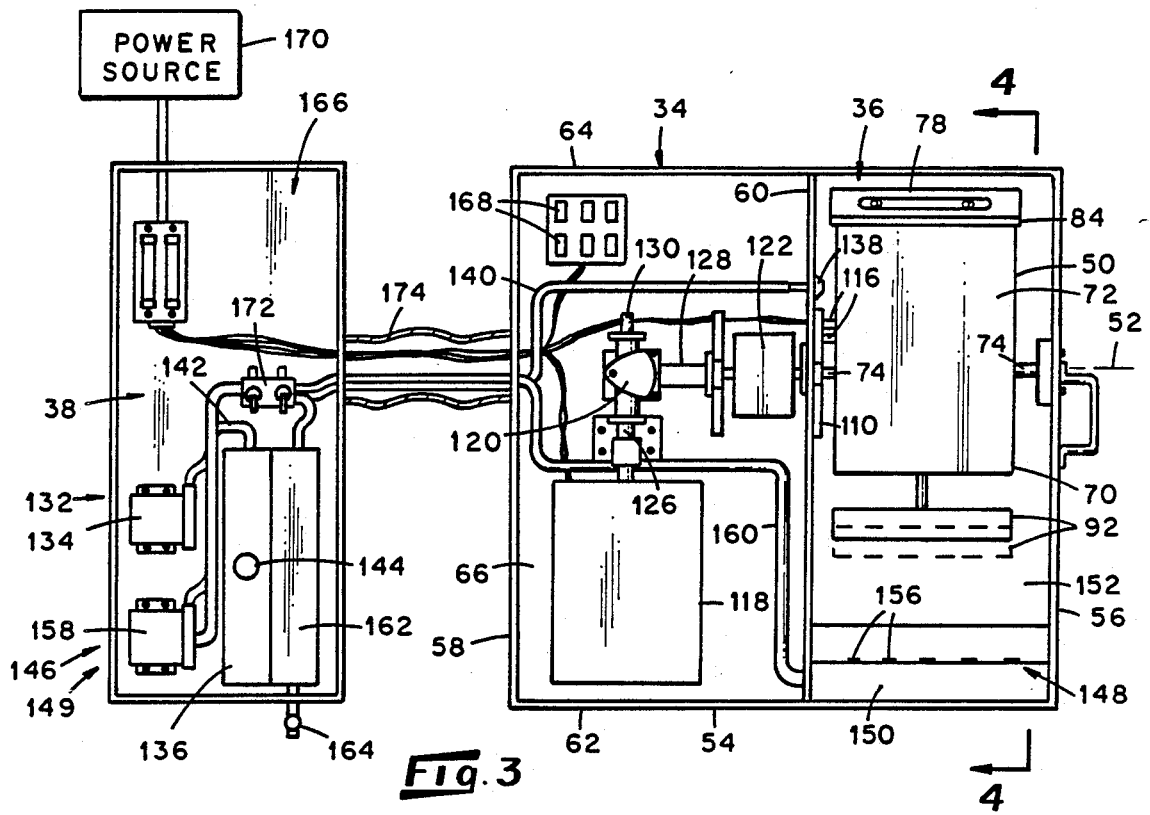
FIG. 3 is a plan view illustrating, in schematic form, components of the apparatus of FIG. 2.

With reference to FIGS. 1—3, the scrubbing/scraping portion 34 includes a head assembly 36 for movement across the grill surface 24 and componentry 38 for supporting the operation of the head assembly 36. As will be apparent herein, some of the supporting componentry 38 is mounted for movement with the head assembly 36 as it is moved across a grill while the remainder of the componentry 38 remains situated upon the table 28. In this connection, and as best shown in FIG. 2, the table 28 includes a lower section 40 having a lower horizontal surface 42 upon which the head assembly 36 and some of the componentry 38 are movably positioned and an upper section 44 having a horizontal surface 46 upon which the remainder of the supporting componentry 38 is fixedly mounted. The table 28 also includes appropriate side, back and front panels for enclosing the head assembly 36 and componentry 38 so that when the apparatus 20 is stored, it is hidden from view. The front panel, indicated 48, of the table 28 is hinged to the remainder of the table 28 for movement between a raised positioned at which the front of the table 28 is closed and a lowered position at which access to the head assembly 36 is provided.

With reference to FIG. 3, the head assembly 36 includes a scrubber/scraper head 50 rotatably mounted for movement between its ends about an axis 52 and a housing 54 within which the head 50 is mounted. The housing 50 includes a front panel 56, a back panel 58, an intermediate panel 60 positioned between the front and back panels 56, 58, and opposite side panels 62, 64 joining the panels 56, 58 60 together. The housing 50 also includes a bottom panel 66 joining the lower edges of the back and intermediate panels 58, 60 and providing a platform upon which some of the componentry 38 is mounted. For purposes of moving the head 50 across the grill surface 24, four wheels 68 (only two shown in FIG. 2) are attached to the bottom panel 66 permitting the head 50 to be rolled across the surface 24.

Figure 4:
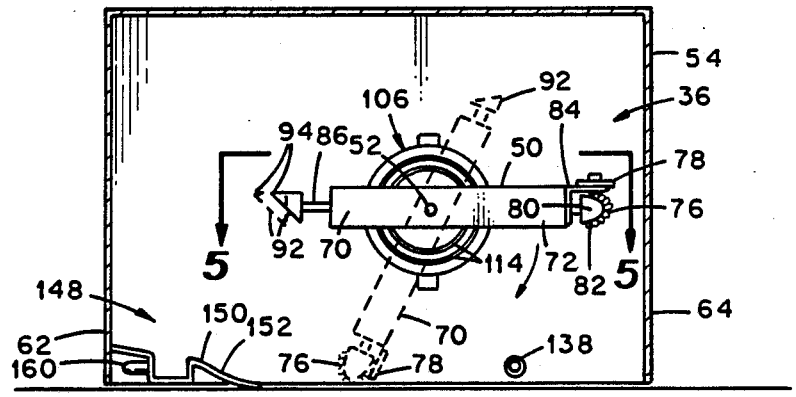
FIG. 4 is a cross-sectional view taken along line 4—4 of FIG. 3.
Figure 5:
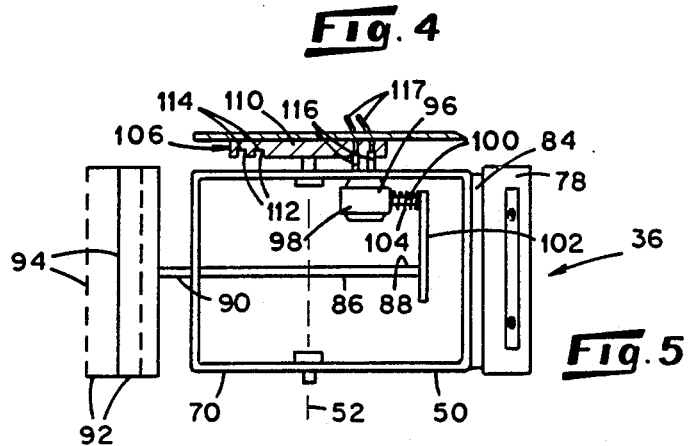
FIG. 5 is a cross-sectional view taken along line 5—5 of FIG. 4.

With reference to FIGS. 4 and 5, the head 50 includes a first elongate means in the form of a substantially enclosed, box-like compartment 70 suitably journaled to the front and back panels 56, 58 by appropriate bearings and aligned shaft members 74 for rotation of the compartment 70 relative to the housing 54 about the axis 52. The head assembly 36 also includes means, indicated 72, attached to one end of the compartment 70 for supporting a steel wool pad 76 and rubber pad 78 for rotation with the compartment 70. As will be apparent herein, the grill surface 24 is scrubbed as the pads 76, 78 are moved in engagement across the surface 24.

The support means 72 includes a head section 80 having an arcuate surface 82 to which the steel wool pad 76 is fixedly secured with screws and a bracket 84 adjacent the head surface 82 to which the rubber pad 78 is fixed by means of a plate and screws. The distance at which each pad 76 or 78 is spaced from the rotation axis 52 is fixed so that during rotation of the compartment 70, the radially-outermost extremities of the pads 76 and 78 move in a circular path of predetermined radius. More specifically, the pads 76, 78 are positioned in relation to the rotation axis 52 so that when the head assembly 36 is rolled across the grill and the head 50 is rotated, the grill surface 24 is scrubbed with the pads 76, 78.

The head assembly 36 also includes second elongate means in the form of a shaft 86 having two opposite ends 88, 90 and which is mounted within the compartment 70 for sliding movement along the length thereof.

As shown in FIG. 5, one shaft end 88 is positioned within the compartment 70 while the other shaft end 90 extends through the compartment end opposite the support means 72. The shaft 86 is slidably movable through its corresponding compartment end so that the shaft end 90 is movable between a retracted condition, as shown in solid lines in FIG. 5, and an extended condition, as shown in phantom in FIG. 5. The head assembly 36 also includes a scraper 92 fixed to the shaft end 90 and having an edge 94 for scraping the grill surface 24 as the edge 94 is moved in engagement across the surface 24. It follows that by moving the shaft 86 between its retracted and extended conditions, the scraper 92 moves by a corresponding amount between retracted and extended conditions. When the scraper 92 is a retracted condition, the scraper edge 94 is spaced from the rotation axis 52 a distance which is less than the distance at which the pads 76, 78 are spaced from the axis 52. Conversely, when the scraper 92 is in an extended condition, the scraper edge 94 is spaced from the axis 52 a distance which is about equal to the distance at which the pads 76, 78 are spaced from the axis 52.

It follows from the foregoing that when the scraper 92 is in a retracted position and the head 50 is rotated about the axis 52 above the grill surface 24, the pads 76, 78 scrub the surface 24 while the scraper 92 is spaced from the surface. By comparison, when the scraper 92 is in an extended position and the head 50 is rotated about the axis 52 above the grill surface 24, both the pads 76, 78 and scraper edge 94 move in engagement across the surface 24 in a combination scrubbing and scraping operation. For present purposes, the apparatus 20 is referred herein to be in its scrubbing mode when the scraper 92 is in its retracted condition, and the apparatus 20 is referred herein to be in its scraper mode when the scraper 92 is in its extended position. Therefore, when the apparatus 20 is in its scraper mode and the head 50 is rotatably moved across a grill surface 24 while the head assembly 36 is rolled thereacross, the edge 94 of the scraper 92 and the pads 76, 78 engagably move across the grill surface 24 during each revolution of the head. Similarly, when the apparatus 20 is in its scrubbing mode and the head 50 rotatably moved across the grill surface 24, the pads 76, 78, and not the scraper 92, engagably move across the surface 24. In addition, for present purposes, the grill surface 24 is being cleaned whether the apparatus 20 moves across the surface 24 in its scraper mode or its scrubbing mode.

For moving the scraper 92 between its extended and retracted conditions, the apparatus 20 includes a solenoid 96 mounted within the compartment 70. As best shown in FIG. 5, the solenoid 96 includes a body 98 fixedly mounted to an inside wall of the compartment 70 and a movable plunger 100 movably mounted within the solenoid body 98 in a conventional manner for movement between extended and retracted positions. The plunger 100 is suitably connected to the shaft 86 by means of an arm member 102 so that actuation of the solenoid moves the plunger 100 to a retracted condition within the body 98 and moves the scraper 92 to its extended condition. A compression spring 104 is interposed between the solenoid body 98 and the arm member 102 so that de-actuation of the solenoid 96 permits the spring 104 to move the scraper 92 to its extended condition.

For providing electrical power to the solenoid 96, the solenoid 96 includes a pair of contacts 116 protruding through one side of its body 98 and one wall of the compartment 70, and the head assembly 36 includes a plate assembly 106 fixed to the intermediate panel 60 of the housing 54 adjacent the compartment 70. The plate assembly 106 includes a plate 110 of insulative material as Teflon, which is bolted or otherwise attached to the intermediate panel 60 and has a face within which two concentric grooves 112 are defined. The plate assembly 106 also includes two conductive rings 114 which are each positioned within a corresponding one of the grooves 112, and the plate 110 is arranged relative to the compartment 70 so that during rotation of the head 50, each solenoid contact 116 moves in a circular path within a corresponding groove 112 and along a corresponding ring 114. A carbon brush associated with each contact 116 is spring-biased into engagement with a corresponding ring 114 to electrically connect the contacts 116 to the rings 114. The plate assembly 106 also includes a pair of terminals 117 extending from the rings 114 and through the plate 110 for supplying electricity to the rings 114.

With reference again to FIG. 3, the apparatus 20 also includes means for rotating the head assembly 20 about the axis 52. In the depicted embodiment 20, the rotation means includes a motor 118 operatively connected to the shaft members 74 through a gearbox 120 and clutch 122 so that actuation of the motor 120 rotates the head 50 relative to the housing 54. Each of the motor 118, gearbox 120 and clutch 122 are supportedly mounted upon the bottom panel 66 and between the intermediate and back panels 60, 58. The motor 118 is arranged so that its shaft rotates at substantially a right angle to the axis of head rotation 52, and the gearbox 120 transfers the rotary power of the motor shaft to that of the head 50 by way of an input shaft 126 and a first output shaft 128. The gearbox 120 also includes a secondary output shaft 130 for a purpose apparent herein. The clutch 122 permits the gearbox output shaft 128 to slip if, during operation of the apparatus 20, the head 50 is exposed to excessive resistance to rotation, such as may be the case if the scraper edge 94 hangs upon the grill surface 24 as it travels thereacross.

With reference still to FIG. 3, the apparatus 20 also includes a system 132 for applying a liquid detergent or similar chemical across the grill surface and beneath the head 50. In the depicted apparatus 20 the application system 132 includes an injection, or spray, pump 134 and a container 136 for holding a quantity of liquid detergent. Both the pump 134 and container 136 are appropriately mounted within the upper section 44 of the table 28. A spray nozzle 138 is mounted within the housing 54 adjacent the head 50 in the manner illustrated in FIGS. 3 and 4 and is connected to the spray pump 134 by a suitable conduit 140 for delivery of the detergent from the pump 134 to the nozzle 138. A conduit 142 is connected between the container 136 and the pump 134 for delivery of detergent from the container 136 to the pump 134. During use of the application system 132, the pump 134 moves detergent from the container 136 and through the spray nozzle 134 in a manner dispensing detergent uniformly and forcibly across the grill surface 24 and generally across the immediate area of the grill surface being scrubbed and/or scraped by the head 50. Preferably, the container 136 is provided with a removable cap 144 in its top facilitating the periodic fill-up of the container 136 with liquid detergent.

The apparatus 20 also includes means, indicated 146, for removing materials, such as grease and grime, loosened by the scraper and/or the scrubber from the grill surface 24. In the depicted apparatus 20, the removing means 146 includes a trap assembly 148 for collecting the grease and grime loosened from the grill surface 24 and a vacuum system 149 for removing the collected grease and grime from the trap assembly 148. With reference to FIG. 5, the trap assembly 148 includes a pan 150 supported within the housing 54 and having a lip 152 extending transversely of the space provided between the housing panels 56, 60 and positioned adjacent the head 50. The pan 150 is shaped so that its lip 152 extends generally toward the section of the grill surface 24 disposed directly beneath the head 50 and so as to form a trap 154 positioned to one side of, or to the left of, as viewed in FIG. 4, the pan lip 152. When the housing 54 is positioned over the surface 24 of the grill to be cleaned, the lip 152 of the pan 150 rests on the grill surface 24 in a condition for receiving the grime or grease moved from the grill surface 24 by the edge 94 of the scraper 92 or by the pads 76, 78. The trap 154 of the pan 150 is sloped to gravitationally direct the collected grease or grime therein toward the rear of the pan 150 where there are defined a plurality of openings 156 (FIG. 3) whose purpose will be apparent herein.

With reference to FIG. 3, the vacuum system 149 includes a pump 158 mounted within the upper section 44 of the table 28 and includes a network of conduits 160 connected in flow communication with the pan openings 156 so that when the vacuum pump 158 is actuated, the grease and grime collected within the trap 154 is sucked therefrom by the vacuum pump 158. Preferably, a suitable screen is placed across each opening to prevent the ingress of particles above a predetermined size. Once the grease and grime removed from the trap, it is pumped into a suitable receptacle 162 mounted within the table upper section 44 for subsequent disposal. Preferably, the receptacle 162 includes a drain valve 164 accessible on one side of the table 28, as shown in FIG. 1, facilitating the periodic draining of the receptacle contents.

The apparatus 20 also includes electrical controls 166 including a plurality of switches 168, best shown in FIG. 3, mounted within the housing 50 and appropriately wired between a suitable power source 170 and the motor 118 and pumps 134, 158 permitting the motor 118 and pumps 134, 158 to be independently actuated. The capacity of the motor 134 and pumps 158 to be independently actuated may be desirable in an instance, for example, during which the grill surface 24 is to be scrubbed or scraped without the application of a liquid detergent thereto. The conduits and wires extending between the table upper section 44 and the head assembly 36 are routed through a flexible hose 174 (FIG. 3) accommodating movement of the head assembly 36 across a grill surface and relative to the table 28. One of the switches 168 is appropriately wired to the solenoid 96 enabling the apparatus 20 to be switched between the scrubber and scraper modes. The apparatus 20 also includes a valve assembly 172 through which the pump conduits are routed. As will be apparent, the valve assembly 172 accommodates hook-up of the detergent spray system and vacuum system of cleaner attachments described herein.

To use the apparatus 20, the table 28 is moved to a location adjacent a grill to be cleaned, and the head assembly 36 is moved off of the table surface 42 and onto the grill surface 24. The apparatus is selectively switched to its scraper or scrubbing mode depending upon the mode of operation desired, and the motor 118 and vacuum pump 158 are switched ON. If desired, the spray pump 134 can be actuated to apply a spray of liquid detergent across the surface 24 of the grill. With the head 50 rotating about the axis 52, the head assembly 36 is moved across the grill surface 24 so that the entire area thereof is scraped and/or scrubbed by the head 50. The grill surface 24 is thereby cleaned by the apparatus 20 in an effective manner, in a relatively short period of time, and with no appreciable expenditure of manual energy.

Figure 6:
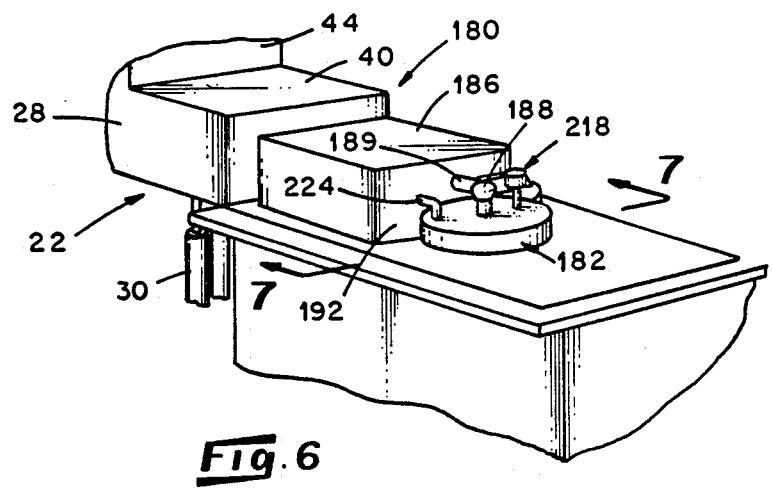
FIG. 6 is a fragmentary perspective view of an alternative embodiment of an apparatus for scrubbing and scraping the surface of a grill.
Figure 7:
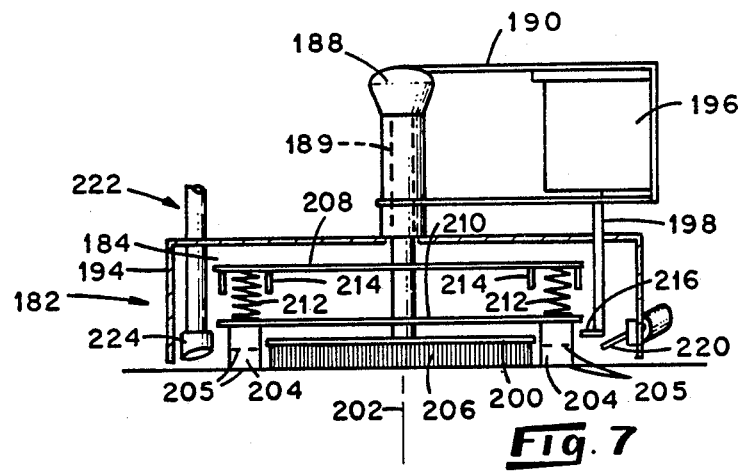
FIG. 7 is a cross-sectional view taken along line 7—7 of FIG. 6.
Figure 8:
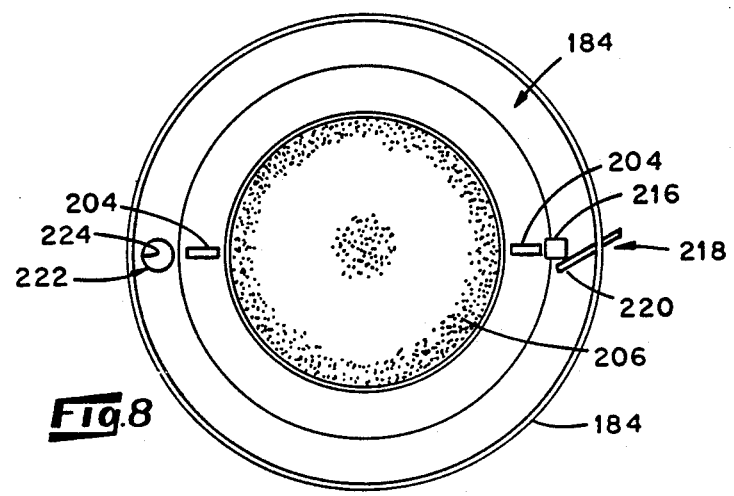
FIG. 8 is a plan view of a fragment of the FIG. 6 apparatus as seen from below in FIG. 7.

Although the head 50 of the aforedescribed apparatus 20 has been shown and described for use for rotation about an axis oriented substantially parallel to a grill surface 24, an apparatus head may be suited for scrubbing and scraping a grill surface when rotated about an axis oriented generally perpendicular to the grill surface. For example, there is shown in FIGS. 6–8 an alternative scrubbing/scraping apparatus 180 having a head assembly 182 including a head 184 (FIG. 7) and a housing 186 within which are mounted various componentry for supporting the operation of the head 184. For present purposes, the support componentry mounted within the housing 186 includes a drive motor, gearbox and clutch identical to those mounted within the housing 54 of the apparatus 20 of FIGS. 1–5. Unlike the apparatus 20, however, the rotational power of the motor for the head 184 of the FIG. 6 embodiment 180 is transferred horizontally through a shaft extending through a front panel, indicated 192, of the housing 186 and then downwardly to the head 184 by way of a suitable gearbox 188 and shaft 189 (FIG. 7). The apparatus 180 also includes a frame 190 affixed to the front panel 192 for supporting the head 184 for rotation above a grill surface.

As best shown in FIG. 7, the head assembly 182 includes an open-bottomed cover member 194 for covering the head and a solenoid 196 mounted upon the frame 190. The solenoid 196 is mounted so that its plunger 198 extends downwardly into the cover member 194 and moves vertically upwardly when actuated. The head 184 includes a circular base plate 200 fixed to the lower end of the shaft 189 for rotation therewith about a vertical axis 202 and a circular disc 210 positioned about the shaft 190 for rotation therewith and for movement upwardly and downwardly relative thereto. Fixedly attached to the underside of the plate 200 are downwardly-directed bristles 206, and depending downwardly from the underside of the disc 210 are a pair of downwardly-directed scrapers 204 positioned outboard of the bristles 206. The head assembly 182 also includes a upper plate 208 disposed above the disc 210 and keyed to the shaft 189 for rotation therewith and a pair of compression springs 212 for acting between the upper plate 208 and the disc 210. If desired, an appropriate sleeve 214 may be positioned about each spring 212 in order to maintain its compression and extension movements along a vertical path.

The solenoid plunger 198 extends downwardly to a location adjacent the disc 210, as shown in FIG. 7, and terminates in a finger member 216 positioned underneath the edge of the disc 210. When the solenoid 196 is actuated, the plunger 196 lifts the disc 210 by way of the finger 216 to a raised position, illustrated in phantom in FIG. 7, at which the lower edge, indicated 205, of each scraper 204 is spaced above the horizontal plane defined by the bristles 206. When the plunger 196 is de-actuated, the disc 210 is returned by way of the springs 212 to its lowered position, illustrated in solid lines in FIG. 7, at which the lower edge 205 of each scraper 204 is positioned in about the plane of the bristles 206. The solenoid 196, of course, receives its power from a suitable source and is controlled by means of an appropriate switch.

It follows that when the apparatus 180 is in its scraper mode, the solenoid 196 is de-actuated and the disc 210 is positioned in its lowered FIG. 7 position so that when the bristles 206 are positioned in engagement with a horizontal grill surface and the head 184 is rotated, the bristles 206 brush the surface and the scrapers 204 engagably move across the surface in a scraping motion. By comparison, when the apparatus 180 is in its scrubbing mode, the solenoid 196 is actuated and the disc 210 is positioned in its raised FIG. 7 position so that when the bristles 206 are positioned in engagement with a horizontal grill surface and the head 184 is rotated, only the bristles 206 engagably move across the surface.

The apparatus 180 also includes a detergent application system 218 including a spray nozzle 220 supported by the cover member 194 and positioned adjacent one side of the base plate 200 for dispensing detergent or the like across the area of the grill surface being cleaned. Detergent can be transferred from a suitable container to the nozzle 220 by means of a spray pump and conduits comparable to those of the apparatus 20 of FIGS. 1–5. The apparatus also includes a vacuum system 222 for removing grease and grime loosened by the scrapers 204 and bristles 206 including a downwardly-opening vacuum hose 224 disposed to one side of the base plate 200 opposite the spray nozzle 220. Power for the vacuum system 222 is provided by an appropriate vacuum pump comparable to that of the apparatus 20 of FIGS. 1–5.

Figure 9:
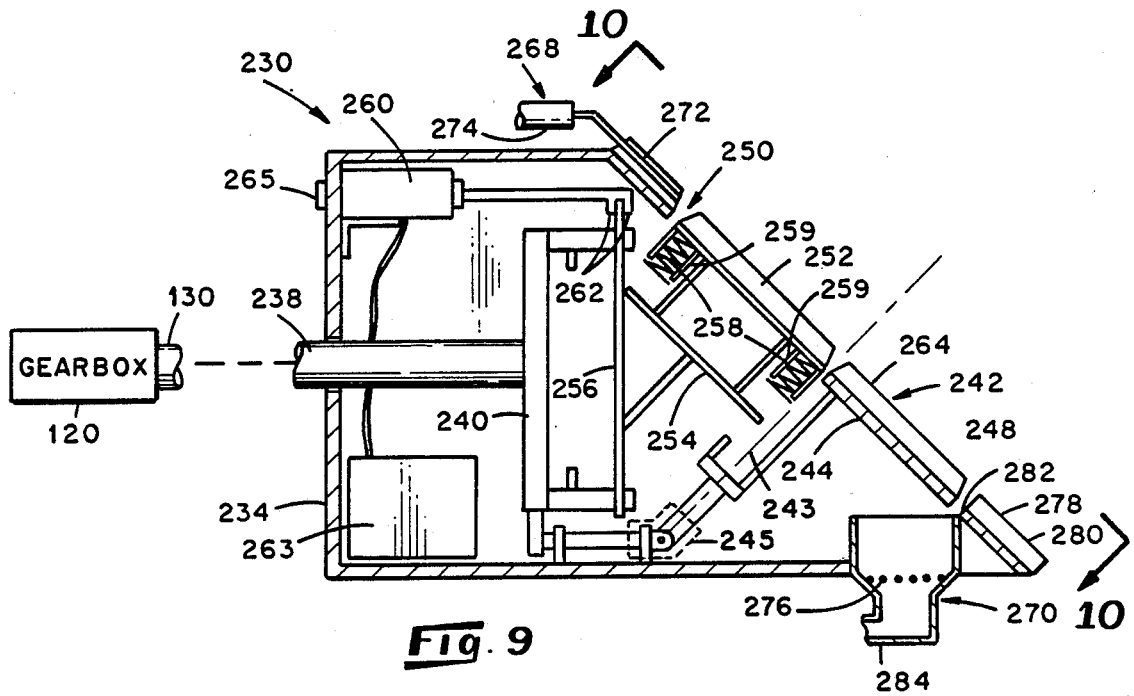
FIG. 9 is a longitudinal cross-sectional view of an attachment for the FIG. 2 apparatus.
Figure 10:
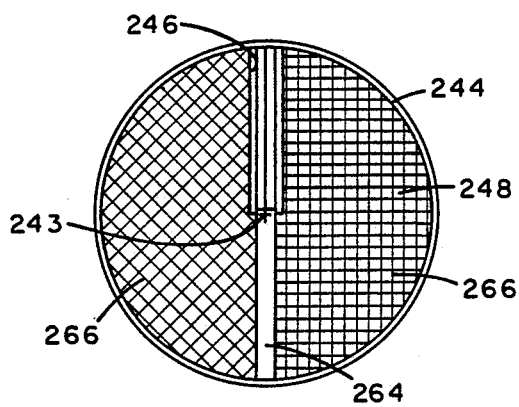
FIG. 10 is a view of the FIG. 9 attachment as seen along line 10—10 of FIG. 9.
Figure 11:
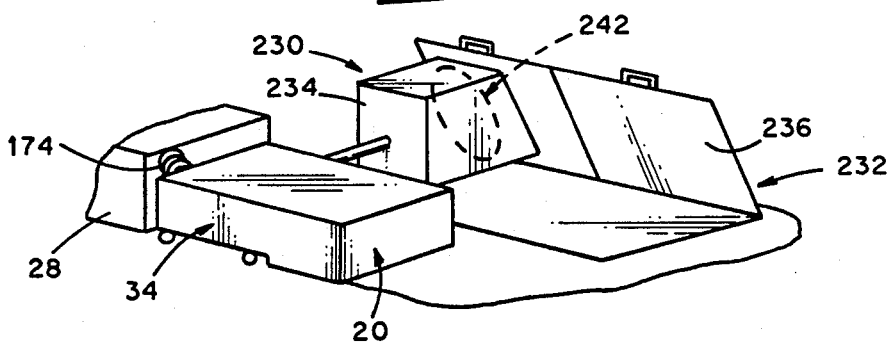
FIG. 11 is a fragmentary perspective view illustrating the FIG. 9 attachment when operatively positioned in cleaning relationship with a surface of clam shell grill.

With reference to FIGS. 9–11, there is illustrated a scraper/scrubbing attachment 230 for the apparatus 20 of FIGS. 1–5 for scraping and scrubbing an inclined surface 236 of a clam shell grill 232 (FIG. 11). The attachment 230 includes a frame 234 and a shaft 238 suitably journaled within the frame 23 for rotation relative thereto about a horizontal axis. As shown in FIG. 9, the shaft 238 has an end which extends from one side of the frame 234 for attachment to the secondary output shaft 130 of the gearbox 120 of the apparatus 20 so that driving power transmitted to the shaft 238 is generated by the motor 118. The other end of the shaft 238 terminates in a disc 240 for a purpose apparent herein.

The attachment 230 also includes a scrubber/scraper head 242 including a circular base plate 244 mounted to the frame 234 for rotation about an axis 243 oriented at an angle with respect to the shaft 238. The base plate 244 is suitably coupled to the disc 240 in a conventional universal joint-type arrangement, illustrated schematically as 245, so that rotation of the shaft 238 about its horizontal axis rotates the base plate 244 about the axis 243 and generally in a plane oriented at an angle disposed at about forty-five degrees with the horizontal.

As best shown in FIG. 9, the base plate 244 has a recess 246 in its working surface, indicated 248, and a scraper assembly 250 is mounted within the recess 246. The scraper assembly 250 includes an elongated scraper 252 having a blade edge directed generally out of the recess 246 and a angled plate 254 which is fixedly joined to a vertical disc plate 256 so as to be spaced from the scraper 252. Compression springs 258 act, by way of rods 259, between the base plate 244 and the scraper 252 for urging the edge of the scraper 252 generally toward the plane of the working surface 248. The vertical disc plate 256 is, in turn, coupled to the disc 240 by means of an appropriate coupling arrangement permitting the angled plate 254 to rotate in a plane parallel to the working surface 248 and permitting the disc plate 256 to be shifted downwardly and rightwardly, as viewed in FIG. 9, between a retracted position at which the edge of the scraper 252 is recessed from the working surface 248 and an extended position at which the edge of the scraper 252 is positioned generally in the plane of the working surface 248.

For moving the scraper 252 between its retracted and extended positions, a solenoid 260 is mounted within the frame 234 for cooperating with the vertical disc plate 256. More specifically, the solenoid 260 has a plunger which terminates in finger members 262 positioned on opposite sides of the vertical disc plate 256. When the solenoid 260 is actuated, the solenoid plunger moves the vertical disc plate 256 leftwardly, as viewed in FIG. 9, so that the scraper 252 is moved to its retracted position. When the solenoid 260 is de-actuated, the scraper 252 is returned to its extended position by the springs 258 and rods 259. It follows that the vertical disc plate 256 is responsible for moving the springs 258 and rods 259 rightwardly as viewed in FIG. 9 upon solenoid de-actuation. Electrical power is supplied to the solenoid 260 from a suitable power supply 234 and controlled by means of an appropriate switch 265.

The scrubber/scraper head 242 also includes a rubber wiper 264 positioned adjacent the working surface 248 of the base plate 244 and appropriately affixed thereto with screws. As shown in FIG. 10, the wiper 264 is generally aligned with the edge of the scraper 252 and extends from the rotational axis 243 of the base plate 244 to the circumferential edge thereof. The head 242 also includes cleaner pads 266 comprised, for example, of steel wool, which are clamped or otherwise releasably attached to the working surface 248 of the plate 244 on opposite sides of the scraper 252 and wiper 264.

It follows from the foregoing that the head 242 is used to selectively scrub or scrap and scrub the surface 236 of a clam shell grill 232 when the surface 236 is held in a inclined condition as illustrated in FIG. 11. With the attachment 230 in its scrubbing mode, the scraper 252 is spaced inwardly from the plane of the working surface 248 so that only the pads 255 and wiper 264 engagably move across the grill surface 236 as the plate 244 is rotated about its axis 243 and moved across the surface 236. By comparison, with the attachment 230 in its scraper mode, the edge of the scraper 252 is positioned in about the plane of the working surface 248 so that the pads 266, wiper 264 and scraper 252 engagably move across the surface 236 as the plate 244 is rotated and moved across the surface 236.

With reference again to FIG. 9, the attachment 230 also includes application means 268 for applying a liquid detergent to the grill surface 236. The detergent application means 268 includes a fine spray nozzle 272 supportedly attached to the frame 234 and generally above the head 242 for delivery of detergent to the area of the grill surface 236 being cleaned. Liquid detergent is routed to the nozzle 272 by way of a conduit 274 having an end which is connectable to the valve assembly 172 (FIG. 3) mounted within the apparatus housing 54 so that by appropriately setting the valve assembly 172 and actuating the spray pump 134, detergent is delivered to the nozzle 272 from the container 136. To facilitate attachment and detachment of the conduit 274 from the valve assembly 172, the conduit 274 is connectable thereto by means of a removable clamp.

For removal of the liquid detergent sprayed across the grill surface 236 and the grease and grime loosened from the grill surface 236 by the head 242, the attachment 230 includes a vacuum system 270. In the depicted attachment, the system 270 includes funnel-like trap 276 supported by the frame 234 generally beneath the lowermost edge of the base plate 244. As shown in FIG. 9, the frame 234 includes a portion 278 having a surface 280 arranged substantially in a coplanar relationship with the working surface 248, and the portion 278 is spaced from the working surface 248 by a gap 282 so that spent detergent and loosened grease and grime which gravitationally flow downwardly across the working surface 248 fall through the gap 282 and into the trap 276. The lowermost end of the trap 276 is connected to a tube 284 through which the collected detergent, grease and grime are permitted to flow for disposal. The tube 284 is connected to the vacuum pump 158 of the apparatus 20 of FIGS. 1-5 by way of the valve assembly 172 for withdrawal of the collected material from the trap 276 and deposit into the receptacle 162. It follows that by appropriately setting the valve assembly 172 and switching the vacuum pump 158 ON, collected detergent, grease and grime are pulled from the trap 276 and through the tube 284.

To use the attachment 230, the shaft 238 is operatively coupled to the output shaft 130 of the apparatus gearbox 120, and the head 242 is moved into operative cleaning relationship with the surface 236 of a clam shell grill 232, as shown in FIG. 11, while the surface 236 is held in an inclined condition. The head 242 is then placed in either its scraper or scrubber mode by appropriate setting of the control switch 265, and the motor 118 (FIG. 3) 118 is switched ON so that the working surface 248 of the head 242 rotates about its axis 243. During the rotation of the working surface 248, the attachment 230 is manipulated across the grill 232 so that the entire area of the grill surface 232 is effectively scraped or scrubbed. As the grease and grime is loosened from the surface 232 by the head 242, it migrates into the trap 276 for disposal. If desired, the detergent application conduit 274 can be operatively connected to the apparatus valve 172 (FIG. 3), and the spray pump 134 can be actuated to direct a liquid detergent across the grill surface 236 in the aforedescribed manner. The detergent sprayed across the grill surface 232, like the loosened grease and grime, eventually migrate into the trap 276 for disposal.

Figure 13:
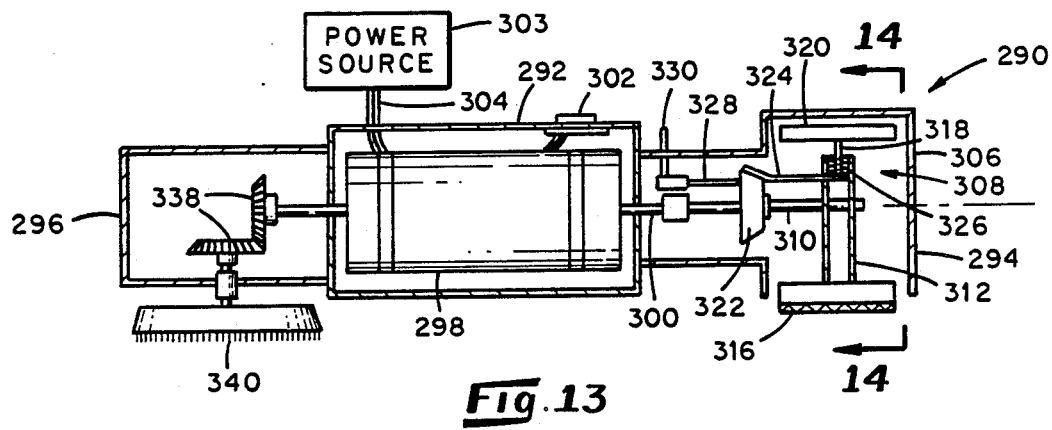
FIG. 13 is a cross-sectional view taken along line 13—13 of FIG. 12.
Figure 14:
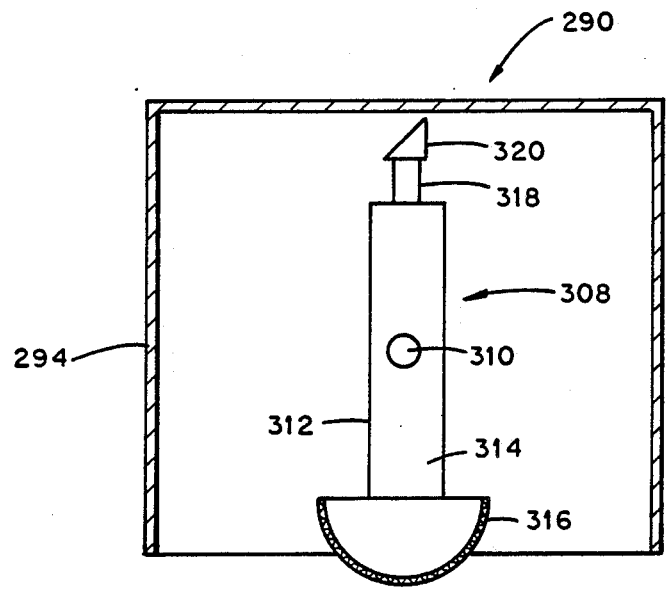
FIG. 14 is a cross-sectional view taken along line 14—14 of FIG. 13.

With reference to FIGS. 13-14, there is illustrated another embodiment, indicated 290, of a scrubber/scraper apparatus. The apparatus 290 includes an elongated handle 292 adapted to be gripped with the hand of a user and first and second head assemblies 294, 296, respectively, attached to the handle 292 on opposite ends thereof. Mounted within the handle 292 is a motor 298 having a double shaft 300 which protrudes through each end of the handle 292 and a switch 302 operatively connected to the motor 298 for controlling the motor operation. Electrical power is supplied to the motor 298 from a suitable power source 303 by means of wires 304.

As best shown in FIG. 13, the first head assembly 294 includes an open-bottomed housing 306 and a head 308 rotatably mounted within the housing 306 by means of a shaft 310. The shaft 310 is appropriately coupled to the motor shaft 300 for receiving rotational power therefrom. The head 308 includes an elongated member 312 fixed to the shaft 310 for rotation therewith and which has a free end 314 to which a scrubber pad 316 is releasably attached. Mounted within the end of the member 312 opposite the free end 314 is a scraper assembly having a shaft 318 slidably received by the member 312 and a scraper 320 attached at a right angle to the shaft 318.

The scraper assembly shaft 318 is slidably movable along the length of the member 312 between a retracted position at which the edge of the scraper 320 rotates along a circular path of smaller diameter than that along which the pad 316 rotates, when the head 308 is rotated, and an extended position at which the edge of the scraper 320 rotates along a circular path of about the same diameter as that along which the pad 316 rotates. Therefore, when the apparatus head 308 is placed in its scrubbing mode and the head 308 is maintained at an appropriate fixed distance from a surface to be cleaned, the scraper 320 is positioned in its retracted position so that only the pad 316 engages the surface upon rotation of the head 308. By comparison, when the head 308 is placed in its scraper mode the scraper 320 is positioned in its extended condition so that both the scraper 320 and pad 316 engage the surface when rotated thereover.

The head 308 is manually switched between its scrubbing and scraping modes and to this end includes appropriate mechanical componentry accessible to the user. Although such mechanical componentry may take any of a number of forms, the apparatus 290 includes a disc 322 mounted upon the shaft 310 for rotational movement therewith and for axial movement therealong and an lever member 324 interposed between the disc 322 and the scraper assembly shaft 318 for shifting the scraper 320 between its retracted and extended conditions as the disc 322 is moved rightwardly and leftwardly, as viewed in FIG. 13, along the shaft 310. A compression spring 326 is mounted within the elongated member 312 for acting between the member 312 and shaft 318 to bias the scraper toward its retracted position.

For moving the disc 322 rightwardly and leftwardly along the shaft 310, there is provided an arm member 328 appropriately coupled at one end of the disc 322 and terminating at its other end in a handle 330 which is accessible to a user. By pulling the handle 330 leftwardly, as viewed in FIG. 13, the disc 322 is moved leftwardly so as to move the scraper 32 to its extended condition. The handle 330 can be manipulated into an appropriate slot 332 (FIG. 12) provided in one side of the housing 306 for maintaining the handle 330 in its leftward position. By releasing the handle 306 from the slot 332, the spring 326 shifts the scraper 320 to its retracted condition and repositions the disc 322 in its rightward position.

With reference again to FIG. 13, the second assembly 296 includes a housing 336 and a circular base 334 supported by the housing 336 for rotation relative thereto. The rotary motion of the motor 298 is transmitted to the base 334 by way of gears 338 so that the base 334 rotates about an axis oriented at a right angle to the motor shaft 300. In the depicted embodiment 290, a brush 340 having hair-like bristles is clamped or otherwise attached to the bottom of the base 334 so that actuation of the motor 334 spins the brush 340 in a plane. To use the second head assembly 296, the motor 298 is actuated and the brush 340 is placed in engagement with the surface to be cleaned so that the rotary movement of the brush 340 across the surface cleans the surface. If desired, a wool pad can be attached to the base 334 in place of the brush 340.

Figure 12:
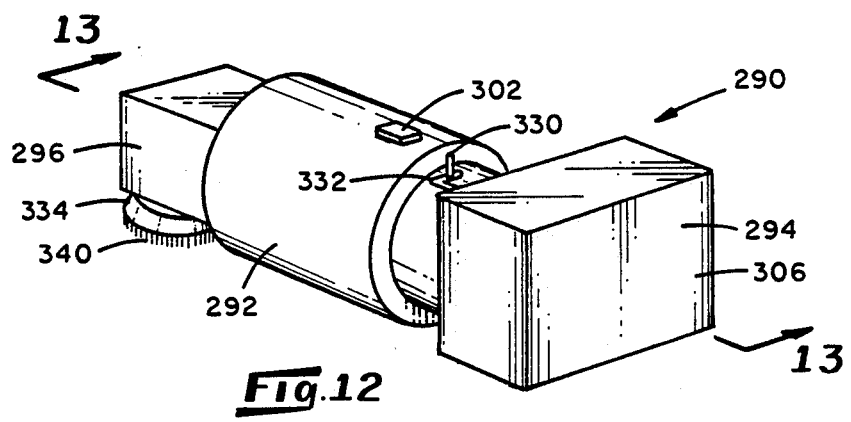
FIG. 12 is a perspective view of another embodiment of an apparatus for scrubbing and scraping the surface of a grill or oven.
Figure 15:
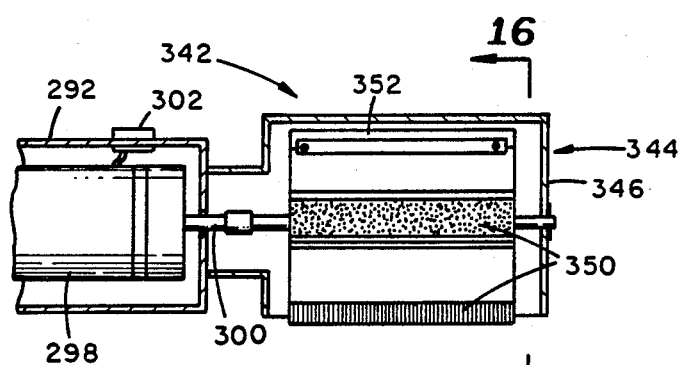
FIG. 15 is a fragmentary view similar to that of FIG. 13 illustrating still another embodiment of an apparatus.
Figure 16:
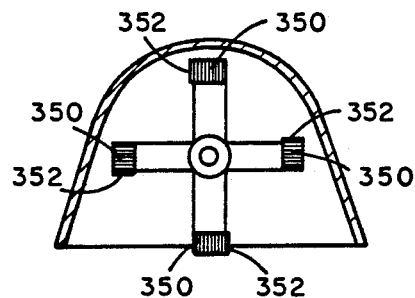
FIG. 16 is a cross-sectional view taken along line 16—16 of FIG. 15.

With reference to FIG. 15 and 16, there is shown still another embodiment, indicated 342, of an apparatus for cleaning a cooking surface. The embodiment 342, like that of the embodiment 290 of FIGS. 12–14, is held within the hand when used and includes components, such as a motor 298, which are comparable to those of the embodiment 290. Accordingly, components of the apparatus 342 which correspond to those of the apparatus 290 bear the same reference numerals. The apparatus 290 also includes a head assembly 344 having a housing 346 and a brush-bearing head 248 rotatably mounted within the housing 346. The head 348 is suitably keyed to the motor shaft 300 for rotation therewith and includes four brushes 350 regularly spaced about the axis of rotation of the head 348. Preferably, a rubber wiper 352 is attached to one side of each brush 350.

To clean a cooking surface with the apparatus 342, the brushes 450 of the head 348 are placed into engagement with the surface to be cleaned and the motor 298 is actuated so that the head 348 rotates about its axis. As the brushes 350 rotates, they strike the surface in a brushing action. The rubber wipers 352 follow the brushes 350 across the surface in a polishing/wiping action. Both the apparatus 342 of FIGS. 15 and 16 and the apparatus 290 of FIGS. 12–14 are well-suited for cleaning the surfaces of an oven.

It will be understood that numerous modifications and substitutions can be had to the aforedescribed embodiment without departing from the spirit of the invention. Accordingly, the aforedescribed embodiments are intended for the purpose of illustration and not as limitation.

What is claimed is:

1. An apparatus for scrubbing and scraping the surface of grill or the like comprising:
   a head supported for rotation about an axis including first means for supporting one of a scrubbing pad or a scraper for movement about the rotation axis and second means for supporting the other of the scrubbing pad or scraper for movement about the rotation axis, the first and second supporting means being interconnected for movement of the second supporting means relative to the first supporting means between a first condition at which both the scraper and scrubbing pad engagably move across the surface being cleaned when the head is positioned in operative relationship with the surface or rotated about the rotation axis and a second condition at which only one of the scraper and scrubbing pad engagably moves across the surface when the head is positioned in operative relationship with the surface and rotated about the rotation axis;
   means connected to said head for rotating said head about the rotation axis; and
   means for moving said second supporting means between said first and second conditions so that said apparatus can be switched between a first mode of operation at which both the scraper and scrubbing pad engagably move across a surface to be cleaned or a second mode of operation at which only one of the scraper and scrubbing pad and engagably moves across the surface.

2. An apparatus as defined in claim 1 wherein said first means for supporting includes first elongated member mounted for movement about the rotation axis and having a free end to which the one of the scrubbing pad or scraper is attached, and said second means for supporting includes a second elongated member having a free end to which the other of the scrubbing pad or scraper is attached, said second elongated member being connected to said first member for sliding movement relative thereto between said first and second conditions, and said means for moving includes means for slidably moving said second elongated member relative to said first elongated member between said first and second conditions.

3. An apparatus as defined in claim 2 wherein said means for moving includes a spring for acting between and thereby moving said second elongated member relative to said first elongated member from one of said first and second conditions toward the other of said first and second conditions.

4. An apparatus as defined in claim 2 wherein said means for moving includes a solenoid for acting between and thereby moving said second elongated member relative to said first elongated member from one of said first and second conditions toward the other of said first and second conditions.

5. An apparatus as defined in claim 2 wherein the head is supported in such a relation to the surface to be cleaned that the axis of rotation of said head is arranged generally parallel to the surface to be cleaned.

6. An apparatus as defined in claim 1 wherein said first supporting means is in the form of a disc having a working surface to which said one of the scrubbing pad and the scraper is attached and for rotation in a plane generally parallel to the surface to be cleaned, and said second supporting means includes a plate to which the other of the scrubbing pad or the scraper is attached and oriented generally parallel to the disc, the plate and the disc being interconnected with one another in a manner permitting the plate to be moved relative to the disc between a first condition at which the scrubbing pad and scraper are arranged in the plane of the working surface and a second condition at which only one of the scraper or scrubbing pad are arranged in the plane of the working surface.

7. An apparatus as defined in claim 1 wherein said means for moving includes a motor having a shaft which rotates about a first axis and the rotation axis of the head is oriented at an angle with respect to the first axis.

8. An apparatus as defined in claim 1 further comprising vacuum means for removing material loosened from the surface by the head.

9. An apparatus as defined in claim 8 wherein said vacuum means includes a vacuum pump and at least one vacuum hose operatively extending between the vacuum pump and the area of the surface being cleaned for removing materials loosened from the surface by the head.

10. An apparatus as defined in claim 9 wherein the vacuum means further includes a receptacle operatively connected to the vacuum pump so that loosened materials removed from the surface by the vacuum means are deposited in the receptacle.

11. An apparatus as defined in claim 9 further including a trap assembly having a trap for collecting loosened materials and a lip joined to the trap for positioning adjacent the area of the surface being scrubbed or scraped by the head, said lip being shaped to provide an inclined surface along which the loosened materials move toward the trap when loosened by the head to facilitate collection of the loosened materials by the trap, and said vacuum hose being connected to the trap for withdrawing the collected materials therefrom by said vacuum pump.

12. An apparatus as defined in claim 1 further comprising application means for applying liquid detergent or the like to the region of the surface being scrubbed or scraped by the head.

13. An apparatus as defined in claim 12 wherein said application means includes a spray nozzle and a spray pump operatively connected to said nozzle for applying the liquid detergent over the region of the surface being scrubbed or scraped by the head.

14. An apparatus as defined in claim 13 further comprising a container for holding an amount of liquid detergent or the like and said spray pump is connected to said container for moving the container contents to the nozzle.

15. An apparatus as defined in claim 12 further comprising vacuum means for removing materials loosened from the surface by the head and detergent applied to the surface.

16. An apparatus for scrubbing and scraping the surface of a grill or the like comprising:
a housing;
a head including a body supported by said housing for rotation relative thereto about an axis, first means for supporting a scrubbing pad for movement about the rotation axis with said body, and second means for supporting a scraper for movement about the rotating axis with said body and cooperating with said first supporting means for movement relative thereto between a first position at which both the scraper and scrubbing pad engagably move across a surface to be cleaned when the head is positioned in operative relationship with a surface to be cleaned and rotated about the rotation axis and a second position at which only the scrubbing pad engagably moves across the surface when the head is positioned in operative relationship with the surface and rotated about the rotation axis;
means connected to said head for rotating said head about the rotation axis;
means for moving said second supporting means relative to said first supporting means between said first and second positions so that said apparatus can be selectively switched between a scraping mode of operation at which both the scraper and scrubbing pad engagably move across the surface to be cleaned and a scrubbing mode of operation at which only the scrubbing pad engagably moves across the surface; and
vacuum means for removing materials loosened from the surface by the head, said vacuum means including a vacuum hose opening adjacent the region of the surface being cleaned by the head for removal of the loosened materials from the vicinity of the surface region being cleaned.

17. An apparatus as defined in claim 16 further comprising application means for applying liquid detergent or the like to the region of the surface being cleaned by the head.

* * * * *